United States Patent [19]
Chevreux

[11] 3,724,911
[45] Apr. 3, 1973

[54] BRAKING CONTROL SYSTEM

[75] Inventor: Gerard Chevreux, Bois-Colombes, France

[73] Assignee: Societe Anonyme D. B. A., Clichy, France

[22] Filed: July 24, 1970

[21] Appl. No.: 62,001

[30] Foreign Application Priority Data

Aug. 1, 1969 France..................................6926486

[52] U.S. Cl........................303/13, 188/106 F, 303/9
[51] Int. Cl...............................................B60t 15/16
[58] Field of Search....188/106 R, 106 P, 106 F, 170; 303/2, 7, 9, 13, 89

[56] References Cited

UNITED STATES PATENTS

| 3,547,233 | 12/1970 | Girvan | 188/170 |
| 3,525,423 | 8/1970 | Sheiry, Jr. | 188/106 F |
| 2,968,153 | 1/1961 | Hackett | 188/106 F X |
| 3,485,537 | 12/1969 | Schlor et al. | 188/106 F X |
| 3,463,276 | 8/1969 | Brooks, Jr. | 188/106 P |
| 3,488,096 | 1/1970 | Hoopes | 303/9 |

Primary Examiner—Milton Buchler
Assistant Examiner—Stephen G. Kunin
Attorney—W. N. Antonis and Plante, Hartz, Smith and Thompson

[57] ABSTRACT

A vehicle braking system is disclosed in which the brakes are hydraulically actuated by the conventional master cylinder and optionally may be mechanically actuated by the usual lever arrangement. A valve is disposed in the fluid conduit interconnecting the master cylinder and the brake and the master cylinder reservoir. The valve is responsive to actuation of the mechanical actuator to shift from a first position preventing communication to the reservoir to a second position preventing communication from the master cylinder into the valve and venting the brakes to the reservoir.

4 Claims, 1 Drawing Figure

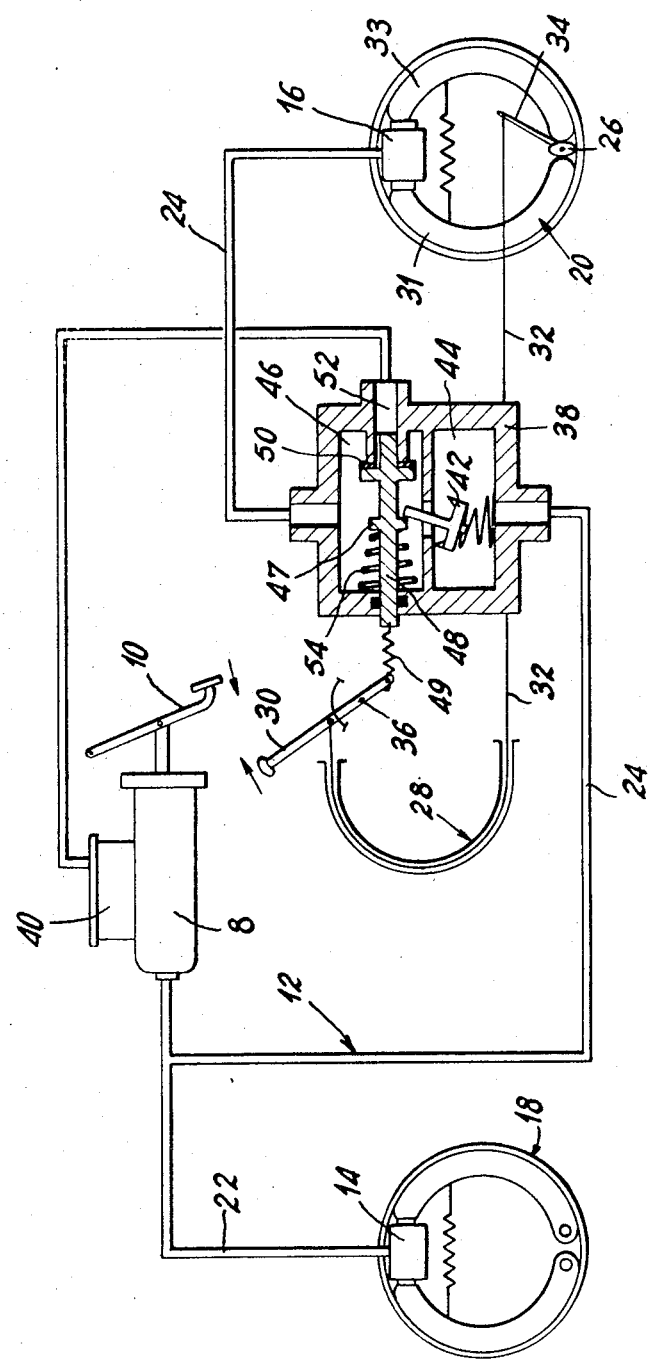

BRAKING CONTROL SYSTEM

This invention relates to a braking control system for controlling actuation of at least one brake mechanism provided with two separate brake actuating means.

In the prior brake mechanisms wherein the primary and the secondary brake actuating means are controlled by a service and an emergency braking control circuits respectively, it has been noted that the common actuating of these two separate circuits generally results in an additive effect of the respective braking forces generated by the two independent brake actuating means and thereby in an excessive resultant effort on each of the braking elements of the brake mechanism. These efforts may cause a permanent deformation of any one of the braking elements of this mechanism such as the drum of a drum brake or the stirrup of a disc brake mechanism since, in most cases, the emergency braking control circuit is provided with locking means adapted to maintain same in its brake applied position. In that latter case, it will be also understood that all the braking efforts are substantially only supported by the secondary braking actuating means and by the emergency braking control circuit controlling same after the service braking actuation has been released. Thus, the emergency or parking control circuit is maintained under excessive stresses that resulting in an abnormal wear and even in an eventual breaking of its various force transmitting elements such as cables, levers, gears, conduits, etc. In certain cases, due to the above stresses and forces, it may be also difficult to actuate the above mentioned locking means or the emergency control circuit to release the brake mechanism.

Furthermore, when using some particular braking mechanisms of the type wherein the secondary brake actuating means does not operate in parallel relationship with the primary brake actuating means, it has been noted that a normal control of these latter means generally prohibits a normal control of the secondary actuating means by the emergency control circuit at that time due to the substantial locked positions of the brake friction elements actuated by said primary means. In other words, during a service application by the primary brake actuating means of the brake mechanism, the various movable elements thereof are so positioned and subjected to such reaction forces that the secondary brake actuating means cannot, at that time, normally actuate and/or position these brake elements as they do in the absence of the primary braking control actuation. In particular, in the event the emergency braking control circuit consists in a mechanical transmission controlled by a hand lever provided with non-releasing locking means, it will be easily understood that the emergency circuit, if actuated during a service brake application, is not capable of maintaining the vehicle brake mechanism in its applied brake position after the service brake control actuation has been released due to the various clearances of the brake mechanism.

With a view to avoiding the above drawbacks, the main feature of the invention is to provide a braking control system for controlling actuation of at least one brake mechanism provided with primary and secondary brake actuating means operatively controlled by a service braking fluid pressure control circuit and an emergency braking control circuit, respectively characterized in that a pressure relief valve controlled by said emergency braking control circuit is operatively provided in said service braking control circuit for terminating the normal braking fluid pressure supply to said primary brake actuating means and for connecting same to a relatively low fluid pressure reservoir upon actuation of said emergency braking control circuit.

Other features and advantages of the invention will appear from the following description taken in connection with the accompanying drawing in which the single FIGURE is a diagrammatic view of a vehicle braking control system according to the invention.

When considering the single FIGURE of the drawing, reference numeral 8 designates a braking fluid pressure control source, such as a conventional master cylinder, adapted, when actuated by a brake pedal 10, to control a variable fluid braking pressure to a service or primary braking control circuit 12 including two sets of brake mechanisms 18 and 20 relating for instance to the front and rear axle wheels of the vehicle, respectively.

In the shown embodiment, the brake mechanisms 18 and 20 are of the pivoting shoe drum brake type, the respective wheel cylinders 14 and 16 of which are connected to the master cylinder 8 by fluid conduits 22 and 24 respectively. At least one of the brake mechanisms 20 is also provided with a second brake actuator device 26 operatively connected to an emergency or secondary braking control circuit 28 including a pivoting hand lever 30 and mechanical force transmitting means, such as a cable 32, adapted to move the input control lever member 34 of actuator 26 upon control pivotal displacement of hand lever 30 about its pivot axis 36. In the shown embodiment, the second actuator 26 is comprised of a cam 26 pivotally mounted on the backing plate of drum brake 20 and operatively located between the free ends of the two brake shoes 31, 33 of brake mechanism 20 to be capable of urging these ends apart from one another upon pivotal displacement of input lever 34 operatively secured to cam 26.

With the above described braking system, it will be easily understood that the actuation of the service braking circuit 12 by means of brake pedal 10 substantially prohibits a normal operation of the emergency or parking braking system 28 by means of hand lever 30. As a matter of fact, as long as the service braking pressure is maintained in brake actuators 14, 16 and thereby as long as the trailing shoe 31 of brake mechanism 20 is hardly urged in engagement with the brake actuating cam 26, this latter cannot be actuated by lever 34 to the extent to maintain the brake mechanism 20 in its fully or even partially applied position whenever the service braking control pressure in actuator 16 is released.

With a view to avoiding the above drawback, the invention provides a braking pressure relief valve, designated as at 38, located in the fluid conduit 24 and operative to connect the fluid brake actuators 16 to a relatively low fluid pressure reservoir 40 such as the hydraulic reservoir of master cylinder 8, upon actuation of the emergency braking system 28. To this end, the valve housing 38 is provided with a tipping valve 42 adapted to control the communication from an inlet chamber 44 connected to master cylinder 8 to an outlet chamber 46 connected to actuators 16 as a function of the axial position of a flange 47 on a movable valve actuating plunger 48 slidably mounted in chamber 46 to protrude externally to housing 38. Plunger 48 is operatively connected at its free outer end to lever 30 by means of a tensible spring 49 and is provided at its opposite end with a check valve 50 controlling communication from outlet chamber 46 to exhaust orifice 52 connected to low pressure reservoir 40. A compression spring 54 is provided between housing 38 and flange 47 to normally urge valve 50 toward its closed position.

The operation of valve 38 is as follows: upon pivotal control displacement of hand lever 30, plunger 48 is urged toward the left, as seen in the drawing, that causing closing of valve 42 and simultaneous opening of valve 50 for thereby releasing the braking pressure if any, in the brake actuators 16, and permitting a normal actuation of the brake actuation cam 26.

As easily understood, the spring 54, in the normal rest position, as shown, of plunger 48, will be advantageously provided with a predetermined load to prevent inopportune actuation of plunger 48 by spring 49 as long as the brake hand lever 30 remains near from its brake releasing position.

I claim:

1. In a vehicle braking system:
a brake having hydraulically actuated applying means and mechanically actuated applying means;
operator-operated fluid pressure generating means for actuating said hydraulically actuated applying means;
mechanically actuated control means for actuating said mechanically actuated applying means;
a fluid reservoir operably connected to said fluid pressure generating means; and
valve means independent of said operator-operated fluid pressure generating means including a housing having an inlet port communicated to said fluid pressure generating means, a first outlet port communicated to said hydraulically actuated applying means, a second outlet port communicated to said fluid reservoir, and valve structure within said housing operably connected to said mechanically actuated control means, said valve structure shifting from a first position communicating said inlet port with said first outlet port and preventing communication through said second outlet port to a second position venting said first outlet port to said second outlet port upon actuation of said mechanically actuated control means.

2. The invention of claim 1:
said valve structure preventing communication between said inlet port and said first outlet port when said valve members are shifted to said second position.

3. The invention of claim 2; and
resilient means yieldably urging said valve structure to said first position.

4. The invention of claim 2:
said housing defining a chamber therewithin, said inlet and outlet ports communicating with said chamber, said valve structure including a first valve member slidably mounted in said chamber, said resilient means yieldably urging said first valve member toward a position preventing communication through said second outlet port, said valve structure further including a second valve member normally permitting communication through said inlet port, but being responsive to movement of said first valve member to terminate communication through said inlet port.

* * * * *